United States Patent [19]
Rouault et al.

[11] Patent Number: 5,739,503
[45] Date of Patent: Apr. 14, 1998

[54] SHIELDING GAS MIXTURE AND PROCESS FOR ARC WELDING OF STAINLESS STEEL WORKPIECES

[75] Inventors: Philippe Rouault, Poissy; Henri Diot, Saint Ouen L'Aumone, both of France

[73] Assignee: L'Air Liquide, Societe Anonyme Pour L'Etude et L'Exploitation des Procedes Georges Claude, Paris, France

[21] Appl. No.: 737,679

[22] PCT Filed: Mar. 19, 1996

[86] PCT No.: PCT/FR96/00411
§ 371 Date: Nov. 22, 1996
§ 102(e) Date: Nov. 22, 1996

[87] PCT Pub. No.: WO96/30158
PCT Pub. Date: Oct. 3, 1996

[30] Foreign Application Priority Data

Mar. 29, 1995 [FR] France .................. 95 03714

[51] Int. Cl.⁶ .................................................. B23K 9/167
[52] U.S. Cl. ............................. 219/137 WM; 219/75
[58] Field of Search ................ 219/74, 75, 137 WM, 219/61

[56] References Cited

U.S. PATENT DOCUMENTS

| | | | |
|---|---|---|---|
| 2,939,942 | 6/1960 | Scheil | 219/74 |
| 3,066,215 | 11/1962 | Espy | 219/74 |
| 3,131,284 | 4/1964 | Gibson | 219/61 |
| 3,770,932 | 11/1973 | Cotter et al. | |
| 5,306,358 | 4/1994 | Lai et al. | |

FOREIGN PATENT DOCUMENTS

| | | |
|---|---|---|
| 0 163 379 | 12/1985 | European Pat. Off. |
| 2007096 | 4/1969 | France |
| 55-024739 | 2/1980 | Japan |

OTHER PUBLICATIONS

R. Wiktorowicz et al., "Shielding gas developments for TIG welding of duplex and super duplex stainless steels", *Welding and Metal Fabrication*, vol. 62, No. 9, Oct. 1994, Great Britain, pp. 379–382.

G. Creffield et al., "Influence of shielding gases on the corrosion resistance of duplex stainless steel GTA welds", *Welding in the World*, vol. 31, No. 6, Nov. 1993, Great Britain, pp. 436–437.

*Primary Examiner*—Clifford C. Shaw
*Attorney, Agent, or Firm*—Young & Thompson

[57] ABSTRACT

The shielding gas mixture for the TIG or GTAW arc welding of stainless steels, in particular of duplex or super duplex steels, comprises, in argon, from 3 to 18%, advantageously approximately 10%, of helium and from 1 to 3%, advantageously approximately 2%, of nitrogen. This gas mixture makes it possible to ensure good corrosion resistance of the metal deposited, acceptable solidity of the welds and excellent arc stability, as well as a suitable viscosity of the molten metal appropriate to manual welding in all positions.

7 Claims, No Drawings

SHIELDING GAS MIXTURE AND PROCESS FOR ARC WELDING OF STAINLESS STEEL WORKPIECES

FIELD OF THE INVENTION

The present invention relates to shielding gas mixtures for the arc welding of austenitic stainless steels using the arc-welding techniques called TIG or GTAW (Gas Tungsten Arc Welding), more particularly for the welding of nitrogen-containing austeno-ferritic stainless steels, called duplex or super duplex steels.

SUMMARY OF THE INVENTION

The object of the present invention is to provide shielding gas mixtures making it possible to improve the welding of stainless steels, in particular to guarantee good corrosion resistance properties, to increase the value of the ultimate tensile strength and to reduce harmful emissions, while at the same time guaranteeing good handling for manual welding in all positions, especially in the so-called "overhead" or "horizontal-vertical" welding position, with low electrode wear, and preserving good arc stability.

In order to achieve this, according to one characteristic of the invention, the gas mixture comprises from 3 to 18%, typically from 5 to 15% and preferably from 8 to 10% of helium, and from 1 to 3%, typically from 1.5 to 2.5% and preferably from 1.5 to 2% of nitrogen, the balance being argon.

The subject of the present invention is a process for welding a stainless steel workpiece, comprising the steps of forming an electric arc between a nonconsumable electrode and the workpiece and of protecting the arc with a shielding gas mixture as defined hereinabove.

DETAILED DESCRIPTION OF THE INVENTION

So-called duplex and super duplex stainless steels exhibit excellent resistance to pitting corrosion compared to other grades of stainless steels because of their austentic/ferritic two-phase microstructure and their content of nitrogen and of other elements, such as chromium and molybdenum. When welding using the GTAW process, the high dilution which may result from this process and the composition of the parent metals and of the filler wires may lead to a volume ratio which is out of balance, in the sense of an excessive ferrite content, except when, for example, the filler wire contains an excess concentration of nickel compared to the parent metal. However, filler metals are not sufficiently superalloyed in nitrogen to ensure good corrosion resistance of the welds. This it why is has been envisaged to add relatively large amounts, greater than 5%, of nitrogen to the shielding gas. However, this has resulted in undesirable effects on arc stability completely unacceptable for manual welding, as well as in problems of solidity of the weld and of significant electrode wear.

The gas mixture according to the present invention exhibits a set of advantageous characteristics, especially the achievement of a correct austenite/ferrite balance, guaranteeing good handling, in all positions, and ensuring an optimum compromise between good corrosion resistance of the metal deposited, acceptable solidity of the welds, low electrode wear, improved appearance of the bead, as well as reduced ozone emissions.

A preferred ternary mixture according to the invention consists of a mixture of approximately 88% of argon, 10% of helium and 2% of nitrogen, this mixture, which is particularly acceptable for the welding of duplex and super duplex steels, being also completely suitable for the welding of nitrogen-doped austenitic stainless grades, the enrichment associated with the nitrogen content of the shielding gas being sufficient, notwithstanding this low content, to make up for the lack of addition of nitrogen via the filler wire.

We claim:

1. Argon-based shielding gas mixture for the manual or automatic arc welding of stainless steels, the mixture comprising:

from 3 to 18% of helium, from 1 to 3% of nitrogen, the balance being argon.

2. Gas mixture according to claim 1, wherein the mixture comprises:

from 5 to 15% of helium, from 1.5 to 2.5% of nitrogen.

3. Gas mixture according to claim 2, wherein the mixture comprises:

from 8 to 10% of helium, from 1.5 to 2% of nitrogen.

4. Ternary gas mixture according to claim 3, characterized in that it comprises approximately 10% of helium and approximately 2% of nitrogen, the balance being argon.

5. An argon-based shielding gas mixture for welding stainless steels, comprising 5–15% helium and no more than 2% nitrogen.

6. A process for welding a stainless steel workpiece, comprising the steps of:

forming an electric arc between a nonconsumable electrode and the workpiece; and at least partially shielding the arc with a shielding gas mixture comprising from 3 to 18% of helium, from one 1 to 3% nitrogen, balance argon.

7. Process according to claim 6, wherein the step of shielding the arc is carried out with a shielding gas mixture having a content of helium between 5 and 15%.

* * * * *